United States Patent
Berger et al.

(10) Patent No.: US 7,999,829 B2
(45) Date of Patent: *Aug. 16, 2011

(54) FACILITATING IMAGE-EDITING OPERATIONS ACROSS MULTIPLE PERSPECTIVE PLANES

(75) Inventors: Ralf Berger, Acton, MA (US); Steven M. Troppoli, Carlisle, MA (US)

(73) Assignee: Adobe Systems Incorporated, San Jose, CA (US)

( * ) Notice: Subject to any disclaimer, the term of this patent is extended or adjusted under 35 U.S.C. 154(b) by 10 days.

This patent is subject to a terminal disclaimer.

(21) Appl. No.: 12/381,703

(22) Filed: Mar. 16, 2009

(65) Prior Publication Data

US 2009/0184979 A1   Jul. 23, 2009

Related U.S. Application Data

(63) Continuation of application No. 11/443,746, filed on May 30, 2006, now Pat. No. 7,525,555, which is a continuation-in-part of application No. 10/974,547, filed on Oct. 26, 2004, now Pat. No. 7,425,958.

(51) Int. Cl.
*G09G 5/00* (2006.01)

(52) U.S. Cl. ......... 345/624; 345/619; 345/620; 345/629

(58) Field of Classification Search .................. 345/619, 345/620, 624–625, 629, 538, 427
See application file for complete search history.

(56) References Cited

U.S. PATENT DOCUMENTS

| | | | |
|---|---|---|---|
| 5,469,536 A | 11/1995 | Blank | |
| 5,706,416 A | 1/1998 | Mann et al. | |
| 6,134,345 A | 10/2000 | Berman et al. | |
| 6,134,346 A | 10/2000 | Berman et al. | |
| 7,199,793 B2 | 4/2007 | Oh et al. | |
| 2004/0095357 A1 | 5/2004 | Oh et al. | |
| 2004/0169664 A1* | 9/2004 | Hoffman et al. | 345/629 |

(Continued)

FOREIGN PATENT DOCUMENTS

WO    01/61649    8/2001

OTHER PUBLICATIONS

International Search Report for PCT/US2007/069220, mailed Nov. 16, 2007.

(Continued)

*Primary Examiner* — Chante Harrison
(74) *Attorney, Agent, or Firm* — Robert C. Kowert; Meyertons, Hood, Kivlin, Kowert & Goetzel, P.C.

(57) ABSTRACT

One embodiment of the present invention provides a system that facilitates performing an image-editing operation across multiple perspective planes. During operation, the system receives a selection for a source area for the image-editing operation, wherein the source area spans one or more perspective planes. The system also receives a selection for a destination area for the image-editing operation, wherein the destination area spans one or more perspective planes. Next, the system defines one or more partial source areas for the one or more perspective planes spanned by the source area. The system also defines one or more partial destination areas for the one or more perspective planes spanned by the destination area. The system then applies the image-editing operation from each partial source area to each relevant partial destination area.

20 Claims, 5 Drawing Sheets

(2 of 5 Drawing Sheet(s) Filed in Color)

U.S. PATENT DOCUMENTS

| | | |
|---|---|---|
| 2005/0030315 A1* | 2/2005 | Cohen et al. .................. 345/538 |
| 2005/0180659 A1 | 8/2005 | Zaklika et al. |
| 2006/0033754 A1 | 2/2006 | Evans |
| 2006/0072035 A1 | 4/2006 | Lee |
| 2006/0087519 A1 | 4/2006 | Berger et al. |

OTHER PUBLICATIONS

"Image-based Modeling and Photo Editing," Byong Mok Oh, et al., Proceedings of the 28th Annual Conference on Computer Graphics and Interactive Techniques SIGGRAPH '01, 10 pages.

* cited by examiner

FACILITATING IMAGE-EDITING OPERATIONS ACROSS MULTIPLE PERSPECTIVE PLANES

RELATED APPLICATION

This application is a continuation of U.S. patent application Ser. No. 11/443,746 filed on May 30, 2006, now U.S. Pat. No. 7,525,555 which is a continuation-in-part of U.S. patent application Ser. No. 10/974,547 filed on Oct. 26, 2004 now U.S. Pat. No. 7,425,958. This application hereby claims priority under 35 U.S.C. §120 to the above-listed patent application. Moreover, the above-listed patent application is hereby incorporated by reference.

BACKGROUND

1. Field of the Invention

The present invention relates to computer-based tools for manipulating digital images. More specifically, the present invention relates to a method and an apparatus that facilitates performing image-editing operations with source and/or destination areas that span multiple perspective planes.

2. Related Art

Unlike conventional film-based images, digital images can be loaded onto a computer system. This allows the digital images to be edited and otherwise manipulated using computer-based "image-editing tools." These image-editing tools can perform various operations on two-dimensional images. For example, typical image-editing tools include: a selection tool that selects a region or an object within an image; a copy tool that copies a selected object from an image; and a paste tool that pastes a copied object into an image. Image-editing tools can also include "image-modification tools," which enable a user to change the color, shape, size and proportions of a selected object.

However, an image may contain elements that are two-dimensional representations of three-dimensional objects. A given three-dimensional object typically includes a number "perspective planes," wherein each perspective plane undergoes a different transformation to produce a corresponding two-dimensional representation of the three-dimensional object. Unfortunately, conventional image-editing tools do not account for perspective, which makes regions of the image having perspective challenging to edit.

This problem has been somewhat alleviated by an image-editing system that accounts for such perspective. (See pending U.S. patent application Ser. No. 10/974,547 filed on 26 Oct. 2004, entitled, "Perspective Editing Tools for 2-D Images," by inventors Ralf Berger and Steve M. Troppoli, which is a parent to the instant application, and is herein referred to as the "parent application.") In the image-editing system disclosed in this parent application, edits are restricted to a single source perspective plane and a single destination perspective plane. Consequently, an image-editing operation that crosses the intersection of multiple perspective planes has to be broken up into multiple image-editing operations. This is extremely cumbersome, if not impossible, for objects having a large number of perspective planes.

Hence, what is needed is a method and an apparatus that facilitates performing image-editing operations with source and/or destination areas that span multiple perspective planes.

SUMMARY

One embodiment of the present invention provides a system that facilitates performing an image-editing operation across multiple perspective planes. During operation, the system receives a selection for a source area for the image-editing operation, wherein the source area spans one or more perspective planes. The system also receives a selection for a destination area for the image-editing operation, wherein the destination area spans one or more perspective planes. Next, the system defines one or more partial source areas for the one or more perspective planes spanned by the source area. The system also defines one or more partial destination areas for the one or more perspective planes spanned by the destination area. The system then applies the image-editing operation from each partial source area to each relevant partial destination area.

In a variation on this embodiment, defining the one or more partial source/destination areas involves performing a recursive or iterative process which involves first orienting (or reorienting) the source/destination area to a current perspective plane, and then attempting to clip the source/destination area on the current perspective plane. If clipping occurs, the system performs the process on each adjacent perspective plane. On the other hand, if no clipping occurs, the system terminates the process.

In a further variation, if the source/destination area was previously oriented with respect to a preceding perspective place, orienting the source/destination area to the current perspective plane involves rotating the source/destination area from the preceding perspective plane to the current perspective plane. This rotation takes place around a line of intersection between the preceding perspective plane and the current perspective plane.

In a further variation, clipping the source/destination area on the current perspective plane involves first converting the source/destination area to unit space and also converting a surface box in the current perspective plane to unit space. It also involves calculating the intersection of the source/source destination area with the surface box in unit space.

In a variation on this embodiment, applying the image-editing operation from each partial source area to each relevant partial destination area involves performing matrix operations to transform partial source areas to partial destination areas.

In a variation on this embodiment, the source area is defined by: a center point; an x-dimension; a y-dimension; and a mask.

In a variation on this embodiment, the destination area is defined by: a location; a scale; and a rotation.

In a variation on this embodiment, the image-editing operation can involve: applying a clone-stamp tool to an image; applying a healing brush to an image; moving an image across a surface defined by one or more perspective planes; or rotating an image across a surface defined by one or more perspective planes.

BRIEF DESCRIPTION OF THE FIGURES

The patent or application file contains at least one drawing executed in color. Copies of this patent or patent application publication with color drawings(s) will be provided by the Office upon request and payment of the necessary fee.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

The data structures and code described in this detailed description are typically stored on a computer-readable storage medium, which may be any device or medium that can store code and/or data for use by a computer system. This includes, but is not limited to, magnetic and optical storage devices such as disk drives, magnetic tape, CDs (compact discs), DVDs (digital versatile discs or digital video discs), or any device capable of storing data usable by a computer system.

Overview

One embodiment of the present invention facilitates selecting source and destination areas for an image-editing tool across multiple perspective planes, thereby removing prior editing restrictions and allowing users to edit as they wish, with the software handling any wrapping to adjacent planes. For example, image content can be essentially wrapped around a corner of two perspective planes or even wrapped up a set of stairs. Content can also be selected around that same corner and unwrapped out to another location.

The basic process operates generally as follows. The system first builds a list of partial selections for each plane that source selection is on, and also builds a similar list of partial selections for the destination selection. Next, for each partial source selection, the system does the image operation (paste, copy, clone, etc) for each partial destination selection.

More specifically, one embodiment of the present invention operates generally as follows. The system breaks each image-editing operation into sub-operations based on the number of source planes and number of destination planes and the intersection between them. Note that each sub-operation is associated with its own transformation matrix and is clipped to its subset of the total operation.

During an image-editing operation, pixels are copied from a source location to a destination location. (This is also true for a conventional image-editing operation, without perspective planes.) In doing so, one embodiment of the present invention accommodates a source area which is half in one plane and half in another, so that the source area wraps around the corner between the planes. This is accomplished by breaking the source area into sub-areas with separate transformation matrices for each.

Hence, one embodiment of the present invention models a source area that spans multiple perspective planes as a set of sub-areas which are associated with different perspective planes. The destination area also has it own set of perspective planes and corresponding sub-areas. This embodiment also includes a mechanism that uses an affine transformation matrix to allow a complex source object to be located anywhere in the destination area. Note that each subcomponent of the source area has a transformation which is based on its placement within the destination image.

Details of the present invention are described in more detail below.

Image-Editing System

Figure 1:
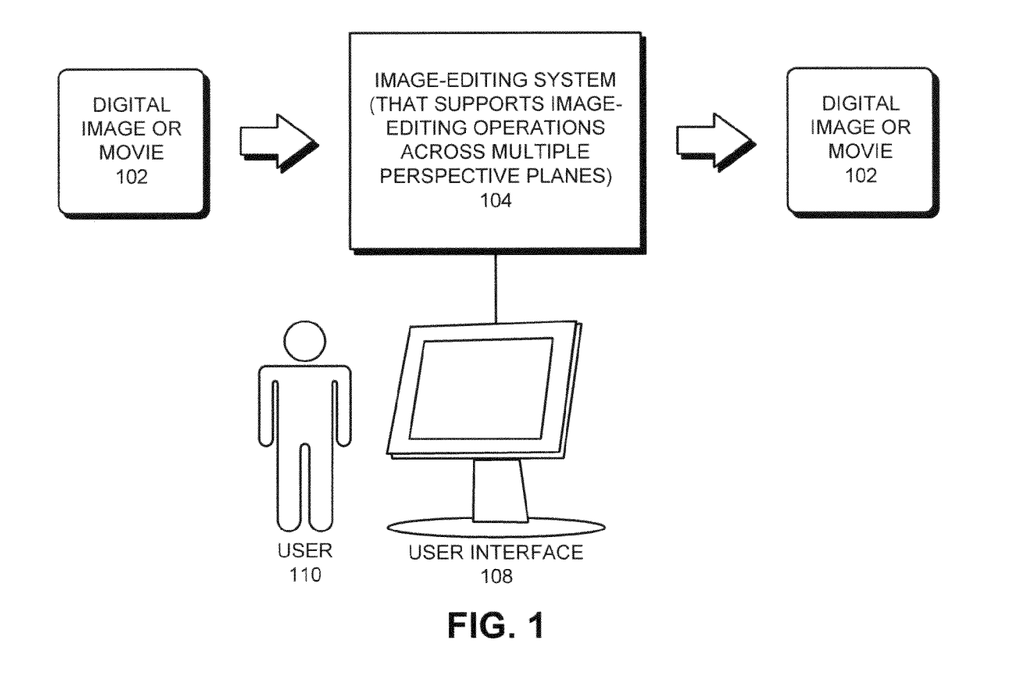
FIG. 1 illustrates an image-editing tool in accordance with an embodiment of the present invention.

FIG. 1 illustrates an image-editing system 104 in accordance with an embodiment of the present invention. Image-editing system 104 takes as input a digital image or movie 102 and generates an edited digital image or movie 106. In doing so, image-editing system 104 allows a user 110 to perform image-editing operations through a user interface (UI) 108. Unlike a conventional image-editing system, image-editing system 104 supports image-editing operations with source and destination areas that span multiple perspective planes.

Note that in general, the present invention can be applied to any type of image-editing operation. For example, the present invention can be applied to: a selection tool that selects a region or an object within an image; a copy tool that copies a selected object from an image; and a paste tool that pastes a copied object into an image.

The present invention can also be applied to "image-modification operations," which enable a user to change the color, shape, size and proportions of a selected object. For example, these image-modification operations can involve: applying a clone-stamp tool to an image; applying a healing brush to an image; moving an image across a surface defined by one or more perspective planes; or rotating an image across a surface defined by one or more perspective planes.

Image-Editing Operation Across Multiple Perspective Planes

Figure 2:
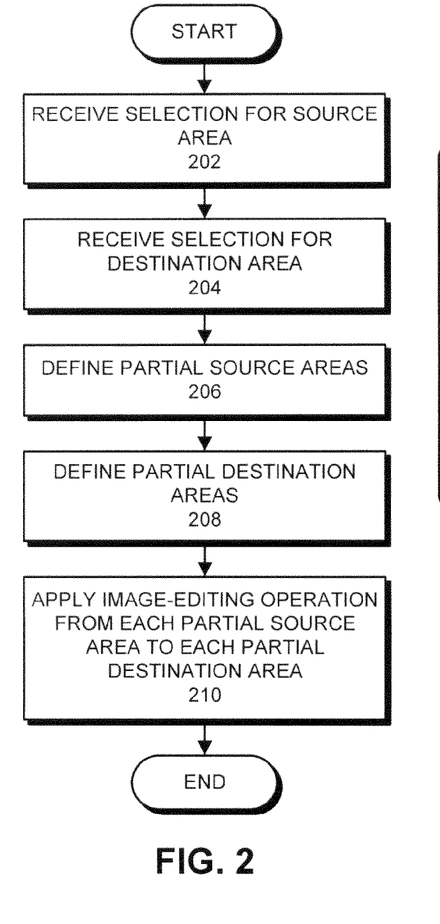
FIG. 2 presents a flow chart illustrating the process of performing an image-editing operation across multiple perspective planes in accordance with an embodiment of the present invention.

FIG. 2 presents a flow chart illustrating the process of performing an image-editing operation across multiple perspective planes in accordance with an embodiment of the present invention. During operation, the system receives a selection for a source area for the image-editing operation, wherein the source area spans one or more perspective planes (step 202). The system also receives a selection for a destination area for the image-editing operation, wherein the destination area spans one or more perspective planes (step 204).

In one embodiment of the present invention, a source area is defined by: a center point; an x-dimension; a y-dimension; and a mask that defines a shape for the source area. Similarly, a destination area is defined by: a location; a scale; and a rotation. During an image-editing operation, the source area is mapped to the destination area. This involves moving the center point of the source area to the location specified for the destination area. It also involves applying the scale and rotation specified for the destination area.

Next, the system defines one or more partial source areas for the one or more perspective planes spanned by the source area (step 206). The system also defines one or more partial destination areas for the one or more perspective planes spanned by the destination area (step 208). The process of defining partial source/destination areas is described in more detail below with reference to FIG. 3.

The system then applies the image-editing operation from each partial source area to each relevant partial destination area (step 210). This involves using a different transformation matrix for each combination of partial source area and partial destination area. This type of transformation matrix is described in more detail in the above-referenced parent application Ser. No. 10/974,547, which is incorporated by reference herein to provide details of this transformation process.

The image operation (as described in the above-referenced parent application) can involve creating a matte in unit space and transforming it to the destination plane orientation and then using it as a mask during the transformation of source to destination pixels. To honor the possibly clipped selections, we can add a process where the matte is trimmed outside the destination selection. This involves a process that is the opposite of a polygon fill; everything outside the polygon is cleared. With this adjusted matte, the image operation can now proceed.

Marquee Border

In one embodiment of the present invention, a pixel area selection is enclosed with a "marquee border" that defines its contents. This is typically a simple rectangle in standard image editing. However, it is a perspective-adjusted polygon in our perspective adjusted environment. To support multiplane selections requires that the border lines be clipped and reoriented to the planes.

We already have a process that creates a list of partial selections on planes. To build the list of line segments that make up the border, we can walk the list and for each clipped selection on a plane we can test each edge line to see if it is a line that was clipped by the plane edge (therefore not part of the border) or an internal line.

In this embodiment, our test for comparing a line to an edge line is to create a line perpendicular to the line and to measure the distance between the intersection of that line and the lines being compared.

After going through every edge of every plane selection we end up with the list of line segments that make up the marquee border.

Stretch Nodes

Some of the above-described image-editing operations involve scaling an image selection. This is typically accomplished by dragging on "stretch nodes" that are placed customarily at the corners and midpoints of the edges. Providing such stretch nodes is fairly easy in a non-perspective model. However, it is considerably more complex in a perspective environment with the midpoints being more complex to calculate. The multi-plane perspective adds the problem of calculating which surface the nodes are on.

While at first this problem seems complicated, is can be simplified by the fact that there can only be four corner nodes and four midpoint nodes. These nodes can be found by finding of the corner and midpoints for each unclipped selection on each surface followed by a test for whether the point is inside the surface plane or not. This test is simply a point in a polygon test. (For example, see "Graphics Gems IV," Academic Press (1994) pg. 37: Crossings, Heckbert, P., ed.)

Defining Partial Source/Destination Areas

Figure 3:
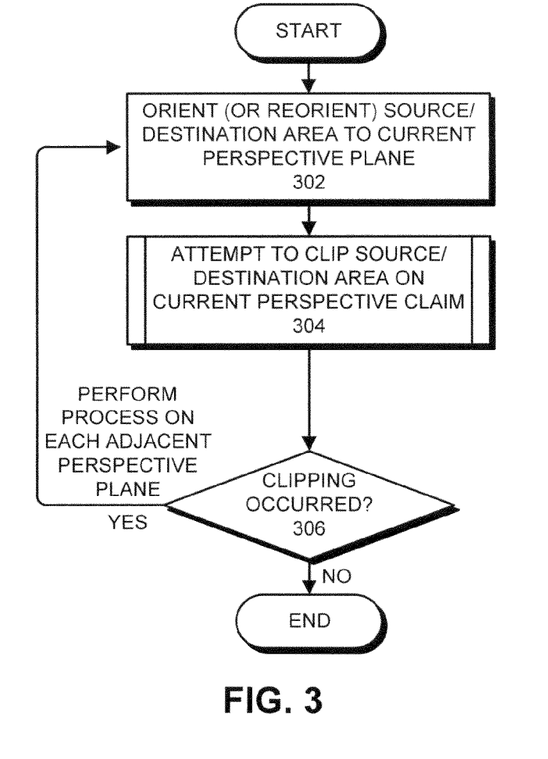
FIG. 3 presents a flow chart illustrating the process of defining partial source areas and partial destination areas in accordance with an embodiment of the present invention.

FIG. 3 presents a flow chart illustrating the process of defining partial source areas or partial destination areas in accordance with an embodiment of the present invention. This process is a recursive (or iterative) process which involves first orienting the source/destination area to a current perspective plane (step 302). Note that if the source/destination area was previously oriented with respect to a preceding perspective place, the source/destination area is "re-oriented" to the current perspective plane by rotating the source/destination area from the preceding perspective plane to the current perspective plane. This rotation takes place around a line of intersection between the preceding perspective plane and the current perspective plane.

Next, the system attempts to clip the source/destination area on the current perspective plane (step 304). The system then determines whether clipping actually occurred (step 306). If clipping occurred, the system returns to step 302 to perform the process on each adjacent perspective plane. On the other hand, if no clipping occurred, the system terminates the process.

Figure 4:
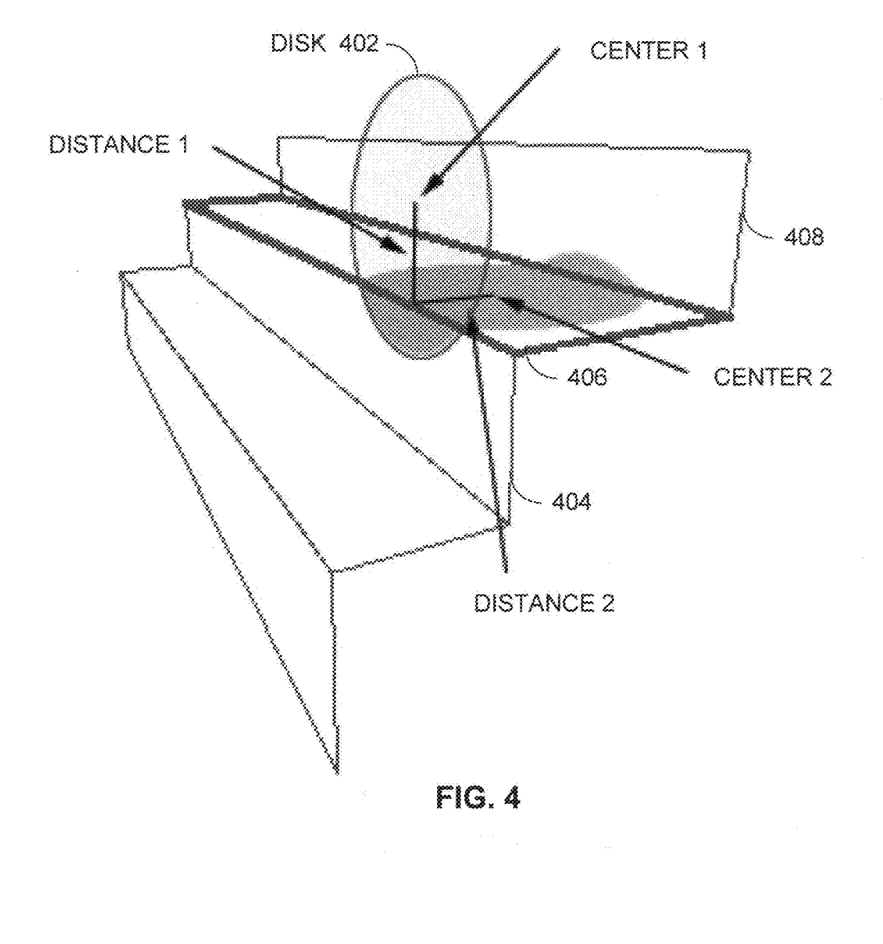
FIG. 4 illustrates an example of the process of defining a partial source/destination area in accordance with an embodiment of the present invention.

An example of this process is illustrated in FIG. 4. In this example, the source/destination area is in the form of a disk 402. As illustrated in FIG. 4, disk 402 is initially oriented with respect to perspective plane 404, and is clipped to produce the partial source/destination area represented by the shaded region on perspective plane 404.

Next, since clipping occurred, the process is repeated, which involves re-orienting disk 402 by rotating disk 402 by 90 degrees around the line of intersection between perspective planes 404 and 406. During this rotation, "Distance1" from the line of intersection to the "Center1" of disk 402 is equal to "Distance2" from the line of intersection to the "Center2" of the rotated disk. Next, the rotated disk is clipped to produce a second partial source/destination area which is represented by the shaded region on perspective plane 406.

The process is then repeated one more time to produce a third partial source/destination area which is represented by the shaded region on perspective plane 408.

Clipping a Source/Destination Area

Figure 5:
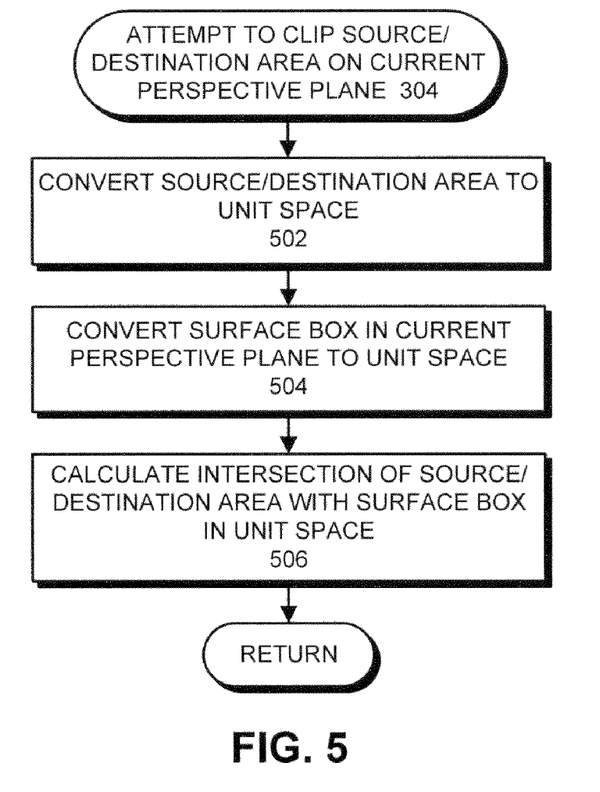
FIG. 5 presents a flow chart illustrating the process of clipping a source/destination area in accordance with an embodiment of the present invention.

FIG. 5 presents a flow chart illustrating the process of attempting to clip a source/destination area in accordance with an embodiment of the present invention. This process involves first converting the source/destination area to unit space (step 502) and also converting a surface box in the current perspective plane to unit space (step 504). (Note that "unit space" is a space that is free from perspective.) It also involves calculating the intersection of the source/source destination area with the surface box in unit space (step 506).

One embodiment of the present invention provides for rotation of the destination area. In this embodiment, the simple intersection test of the transformed selection and surface will not work. Instead, we use a polygon to define the rotated selection in unit space. Furthermore, clipping is determined by the intersection of the selection polygon with the surface rectangle using standard methods, such as the Liang-Barskey polygon clipping technique.

Example Output

Figure 6:
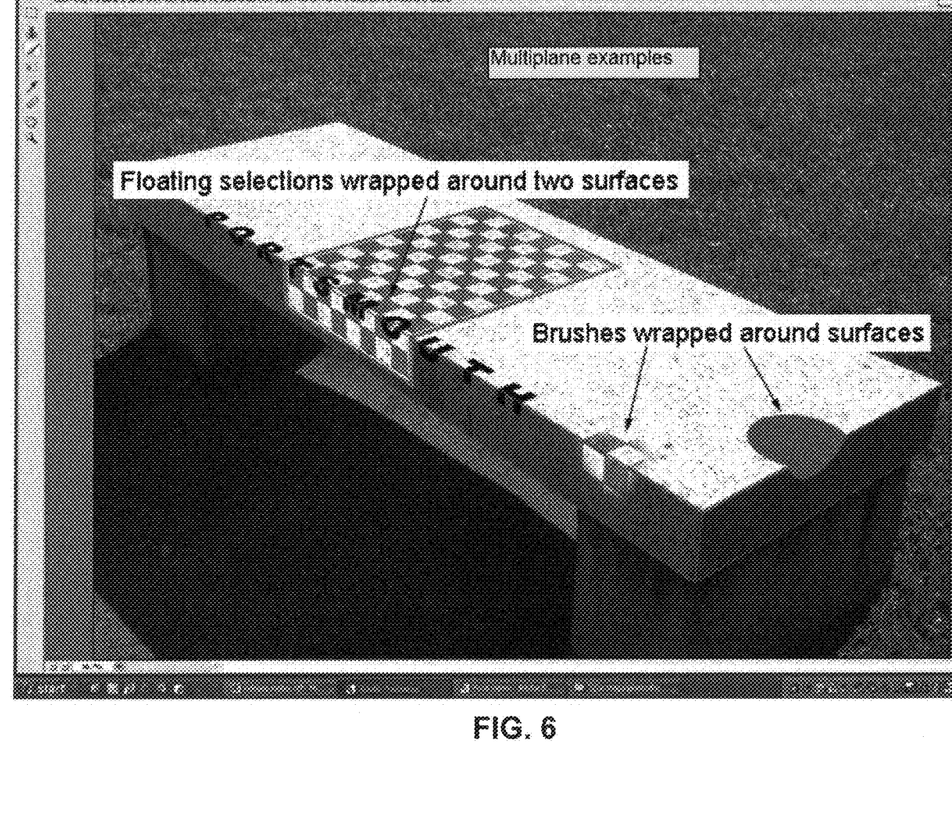
FIG. 6 illustrates an exemplary result of image-editing operations applied across multiple perspective planes in accordance with an embodiment of the present invention.

FIG. 6 illustrates an exemplary result of image-editing operations applied across multiple perspective planes in accordance with an embodiment of the present invention. Note how the chess board and the word "PORTSMOUTH" are wrapped around the bench surface. Also note how the brushes for the image-editing tool can be similarly wrapped around the bench surface.

Corner Case

An interesting case arises when the perspective planes form a corner. This "corner case" follows the same rules as any other case. The process looks at adjacent surfaces and continues until there is no more overlap. The corner case is limited by the rules of perspective transformation and mimics the real world case of bending a pie plate across the corner of a file cabinet. The only way to have the edges line up is to center the pie plate on the corner.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclo-

What is claimed is:

1. A method for performing an image-editing operation, comprising:
performing by a computer:
mapping a source area which spans a plurality of perspective planes to a destination area which spans one or more perspective planes, comprising:
defining a plurality of partial source areas within the source area, wherein each of the plurality of partial source areas comprises a respective two-dimensional surface and is oriented within a respective one of the plurality of perspective planes spanned by the source area; and
defining a plurality of partial destination areas within the destination area, wherein each of the plurality of partial destination areas comprises a respective two-dimensional surface and corresponds to a respective one of the plurality of partial source areas, and wherein the plurality of partial destination areas are oriented within the one or more perspective planes spanned by the destination area; or
mapping a source area which spans one or more perspective planes to a destination area which spans a plurality of perspective planes, comprising:
defining a plurality of partial destination areas within the destination area, wherein each of the plurality of partial destination areas comprises a respective two-dimensional surface and is oriented within a respective one of the plurality of perspective planes spanned by the destination area; and
defining a plurality of partial source areas within the source area, wherein each of the plurality of partial source areas comprises a respective two-dimensional surface and corresponds to a respective one of the plurality of partial destination areas, and wherein the plurality of partial source areas are oriented within the one or more perspective planes spanned by the source area; and
applying the image-editing operation from each partial source area to each corresponding partial destination area;
wherein defining the plurality of partial source areas comprises clipping the source area to one of the perspective planes spanned by the destination area, or wherein defining the plurality of partial destination areas comprises clipping the destination area to one of the perspective planes spanned by the source area.

2. The method of claim 1, wherein defining the partial source areas includes a process comprising:
orienting the source area to a current perspective plane;
attempting to clip the source area on the current perspective plane;
if clipping occurs, performing the process on each adjacent perspective plane, and
if no clipping occurs, terminating the process.

3. The method of claim 2, wherein if the source area was previously oriented with respect to a preceding perspective place, orienting the source area to the current perspective plane comprises:
rotating the source area from the preceding perspective plane to the current perspective plane;
wherein the rotation takes place around an line of intersection between the preceding perspective plane and the current perspective plane.

4. The method of claim 2, wherein clipping the source area on the current perspective plane comprises:
converting the source area to unit space;
converting a surface box in the current perspective plane to unit space; and
calculating the intersection of the source area with the surface box in unit space.

5. The method of claim 1, wherein defining the partial destination areas includes a process comprising:
orienting the destination area to a current perspective plane;
attempting to clip the destination area on the current perspective plane;
if clipping occurs, performing the process on each adjacent perspective plane, and
if no clipping occurs, terminating the process.

6. The method of claim 5, wherein if the destination area was previously oriented with respect to a preceding perspective place, orienting the destination area to the current perspective plane comprises:
rotating the destination area from the preceding perspective plane to the current perspective plane;
wherein the rotation takes place around an line of intersection between the preceding perspective plane and the current perspective plane.

7. The method of claim 5, wherein clipping the destination area on the current perspective plane comprises:
converting the destination area to unit space;
converting a surface box in the current perspective plane to unit space; and
calculating the intersection of the destination area with the surface box in unit space.

8. The method of claim 1, wherein applying the image-editing operation from each partial source area to each corresponding partial destination area comprises performing matrix operations to transform the partial source areas to the partial destination areas.

9. A computer-readable storage medium storing instructions that when executed by a computer cause the computer to perform a method comprising:
mapping a source area which spans a plurality of perspective planes to a destination area which spans one or more perspective planes, comprising:
defining a plurality of partial source areas within the source area, wherein each of the plurality of partial source areas comprises a respective two-dimensional surface and is oriented within a respective one of the plurality of perspective planes spanned by the source area; and
defining a plurality of partial destination areas within the destination area, wherein each of the plurality of partial destination areas comprises a respective two-dimensional surface and corresponds to a respective one of the plurality of partial source areas, and wherein the plurality of partial destination areas are oriented within the one or more perspective planes spanned by the destination area; or
mapping a source area which spans one or more perspective planes to a destination area which spans a plurality of perspective planes, comprising:
defining a plurality of partial destination areas within the destination area, wherein each of the plurality of partial destination areas comprises a respective two-dimensional surface and is oriented within a respective one of the plurality of perspective planes spanned by the destination area; and defining a plurality of partial source areas within the source area, wherein each of the plurality of partial source areas comprises a respective two-dimensional surface and corresponds to a respective one of the plurality of partial destination areas, and wherein the plurality of partial source areas are oriented within the one or more perspective planes spanned by the source area; and applying the image-editing operation from each partial source area to each corresponding partial destination area;

wherein defining the plurality of partial source areas comprises clipping the source area to one of the perspective planes spanned by the destination area, or wherein defining the plurality of partial destination areas comprises clipping the destination area to one of the perspective planes spanned by the source area.

10. The computer-readable storage medium of claim 9, wherein defining the partial source areas includes a process comprising:
orienting the source area to a current perspective plane;
attempting to clip the source area on the current perspective plane;
if clipping occurs, performing the process on each adjacent perspective plane, and
if no clipping occurs, terminating the process.

11. The computer-readable storage medium of claim 10, wherein if the source area was previously oriented with respect to a preceding perspective place, orienting the source area to the current perspective plane comprises:
rotating the source area from the preceding perspective plane to the current perspective plane;
wherein the rotation takes place around an line of intersection between the preceding perspective plane and the current perspective plane.

12. The computer-readable storage medium of claim 9, wherein defining the partial destination areas includes a process comprising:
orienting the destination area to a current perspective plane;
attempting to clip the destination area on the current perspective plane;
if clipping occurs, performing the process on each adjacent perspective plane, and
if no clipping occurs, terminating the process.

13. The computer-readable storage medium of claim 12, wherein if the destination area was previously oriented with respect to a preceding perspective place, orienting the destination area to the current perspective plane comprises:
rotating the destination area from the preceding perspective plane to the current perspective plane;
wherein the rotation takes place around an line of intersection between the preceding perspective plane and the current perspective plane.

14. The computer-readable storage medium of claim 9, wherein applying the image-editing operation from each partial source area to each corresponding partial destination area involves performing matrix operations to transform the partial source areas to the partial destination areas.

15. An apparatus, comprising:
a receiving mechanism configured to receive a selection for a source area and a destination area for an image-editing operation;
a defining mechanism, wherein the defining mechanism is configured to:
define a plurality of partial source areas within the source area, wherein each of the plurality of partial source areas comprises a respective two-dimensional surface and is oriented within a respective one of a plurality of perspective planes spanned by the source area; and
define a plurality of partial destination areas within the destination area, wherein each of the plurality of partial destination areas comprises a respective two-dimensional surface and corresponds to a respective one of the plurality of partial source areas, and wherein the plurality of partial destination areas are oriented within one or more perspective planes spanned by the destination area; or wherein the defining mechanism is configured to:
define a plurality of partial destination areas within the destination area, wherein each of the plurality of partial destination areas comprises a respective two-dimensional surface and is oriented within a respective one of a plurality of perspective planes spanned by the destination area; and
define a plurality of partial source areas within the source area, wherein each of the plurality of partial source areas comprises a respective two-dimensional surface and corresponds to a respective one of the plurality of partial destination areas, and wherein the plurality of partial source areas are oriented within the one or more perspective planes spanned by the source area; and an image-editing mechanism configured to apply the image-editing operation from each partial source area to each corresponding partial destination area;

wherein the defining mechanism is configured to, in defining the plurality of partial source areas, clip the source area to one of the perspective planes spanned by the destination area, or in defining the plurality of partial destination areas, clip the destination area to one of the perspective planes spanned by the source area.

16. The apparatus of claim 15, wherein in defining the partial source areas, the defining mechanism is configured to perform a process comprising:
orienting the source area to a current perspective plane;
attempting to clip the source area on the current perspective plane;
if clipping occurs, performing the process on each adjacent perspective plane, and
if no clipping occurs, terminating the process.

17. The apparatus of claim 16, wherein if the source area was previously oriented with respect to a preceding perspective place, the defining mechanism is configured to orient the source area to the current perspective plane by:
rotating the source area from the preceding perspective plane to the current perspective plane;
wherein the rotation takes place around an line of intersection between the preceding perspective plane and the current perspective plane.

18. The apparatus of claim 15, wherein in defining the partial destination areas, the defining mechanism is configured to perform a process comprising:
orienting the destination area to a current perspective plane;
attempting to clip the destination area on the current perspective plane;
if clipping occurs, performing the process on each adjacent perspective plane, and
if no clipping occurs, terminating the process.

19. The apparatus of claim 18, wherein if the destination area was previously oriented with respect to a preceding perspective place, the defining mechanism is configured to orient the destination area to the current perspective plane by:
rotating the destination area from the preceding perspective plane to the current perspective plane;
wherein the rotation takes place around an line of intersection between the preceding perspective plane and the current perspective plane.

20. The apparatus of claim 15, wherein in applying the image-editing operation from each partial source area to each corresponding partial destination area, the image-editing mechanism is configured to perform matrix operations to transform partial source areas to partial destination areas.

* * * * *